Aug. 4, 1964
E. A. THOMPSON
3,143,007
HYDRAULIC ASSIST FOR PRESS
Filed June 30, 1961
4 Sheets-Sheet 1
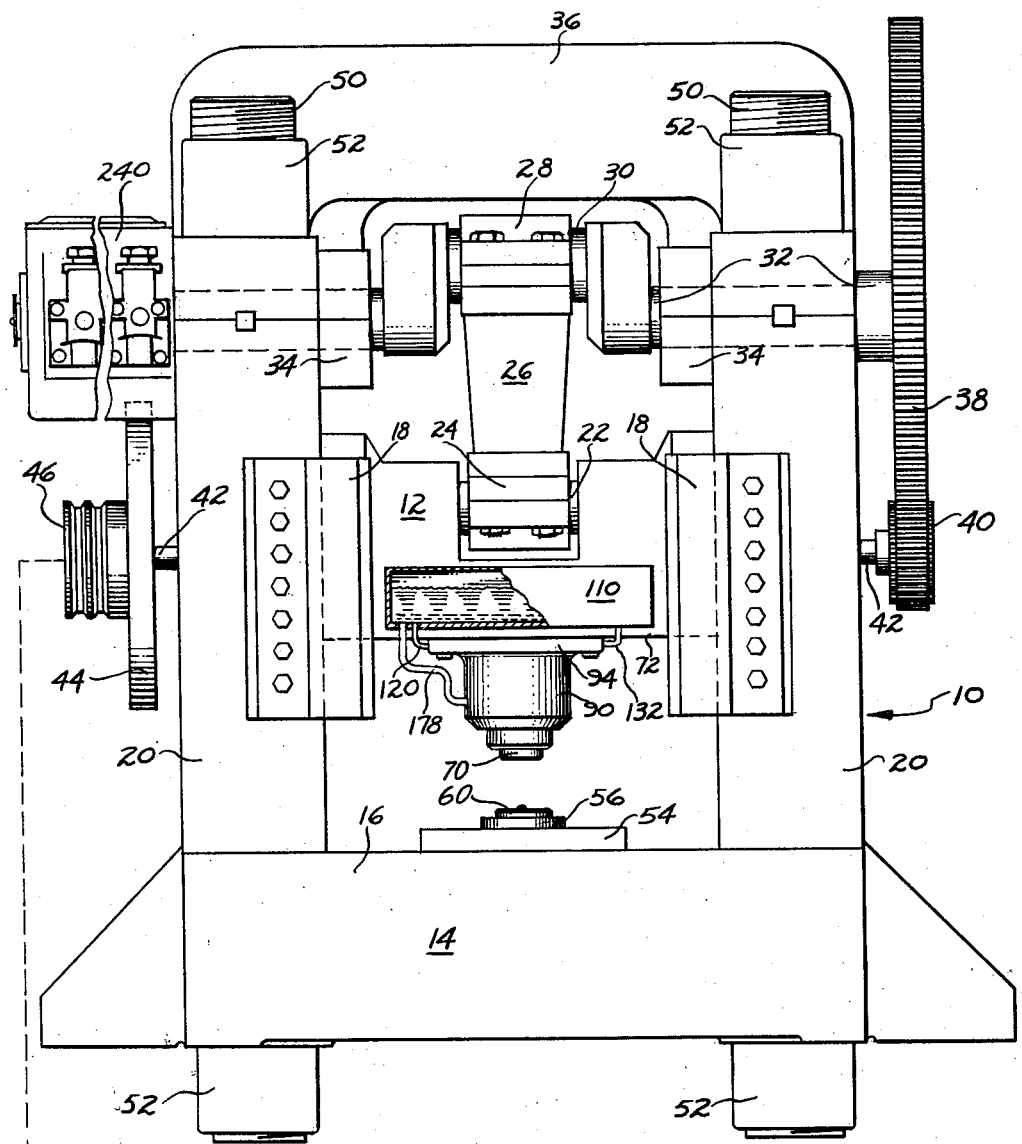
Fig. 1
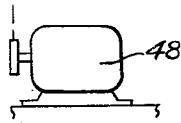
INVENTOR.
EARL A. THOMPSON
BY
Ralph L. Tweedale
ATTORNEY

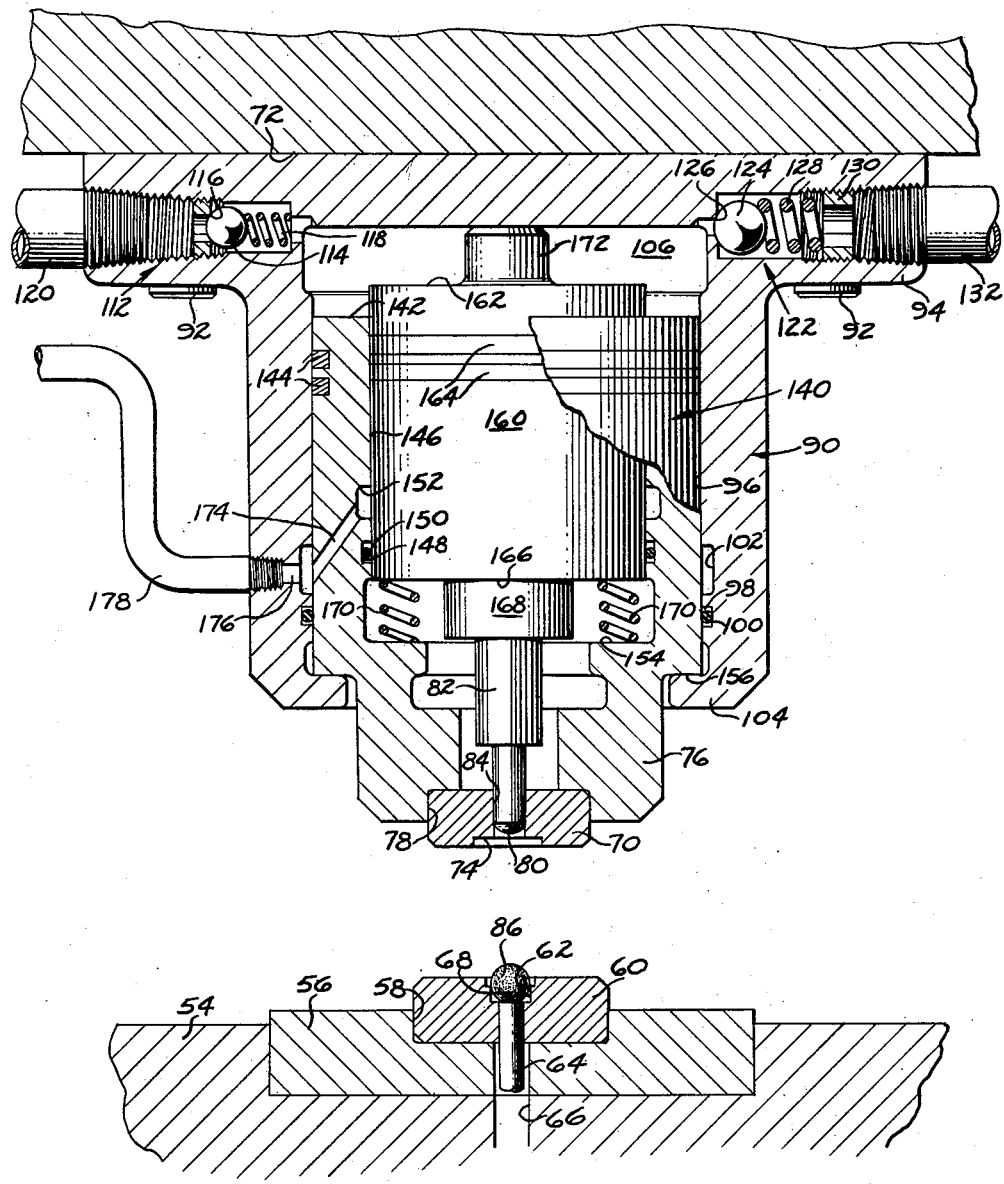

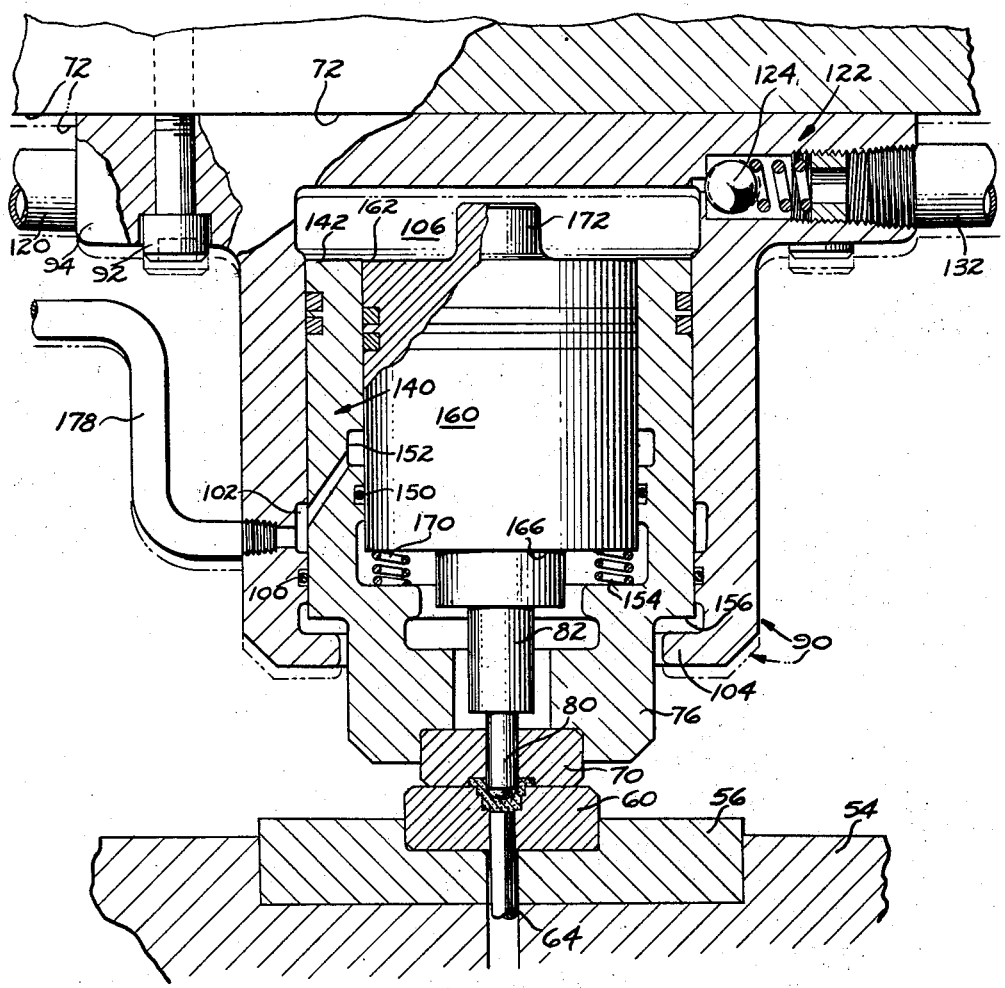

INVENTOR.
EARL A. THOMPSON
BY
ATTORNEY

United States Patent Office 3,143,007
Patented Aug. 4, 1964

3,143,007
HYDRAULIC ASSIST FOR PRESS
Earl A. Thompson, 1300 Hilton Road, Ferndale, Mich.
Filed June 30, 1961, Ser. No. 121,215
1 Claim. (Cl. 78—13)

This invention relates to presses, and more particularly to extrusion die element actuating presses of the high speed reciprocating type wherein a pair of die elements are brought into mating engagement to form a die cavity around a slug of material to be extruded and then a heading tool die element is introduced into the cavity with sufficient force to cause plastic flow of the slug until the material closely embraces the multiple die elements to completely form an article or product.

In prior extrusion devices, one of the two die elements is often mounted on the stationary press bed while the other element or heading tool is mounted on the traveling ram to move into operative relation with the stationary element. With this arrangement the die elements cannot form a completely enclosed cavity but must leave an escape channel so that even a smaller than average slug of material will fill the channel to at least the desired dimensions, and a larger than average slug will of course extrude excess material into the escape channel to avoid serious damage to the press equipment. Then a separate machining operation is required to finish the desired dimension on the part in the die's escape channel direction.

It has been proposed to extrude a part completely sized in every dimension by providing a die cavity which completely encloses the slug of extrusion material. But, an undersized slug will not provide enough material to fill the hole or cavity, especially the remote corners, and an oversized pellet of course interferes with the ram travel at the end of the closing stroke and damages the extrusion die element or the press itself. Until satisfactory means of supplying slugs of an exact, measured size are available at a modest price, such proposals have heretofore been completely inapplicable to high speed extrusion production of large quantities of similar articles. Conventional hydraulic presses with pressure relief type safety valves to interrupt ram travel when the material has filled the die are not applicable to high speed press operations in the neighborhood of 100 reciprocations per minute and up, and are extremely wasteful in both cost and power for extrusion operations.

Another problem confronting manufacturers of extruded parts is the power needed even in the high speed energy storing fly-wheel type of mechanical crank presses. The ram of a crank press reaches the slowest deceleratory portion of its harmonic travel at the terminal portion of its stroke just when a more rapid movement of the heading tool would be most beneficial to impart plastic flow to the extrusion material. Press platens with rams mounted for additional motion to increase the ram speed have heretofore proved inapplicable to the higher speed operations because of hydraulic timing difficulties or the complexity and inherent weaknesses of mechanical advantage linkages.

Furthermore, the often inadequate spring loadings or intricate laterally shifting mechanisms currently employed to manipulate the various parts of multiple-action dies do not function with positive power and speed mandatory in high volume extrusion operations.

Accordingly, it is an object of the present invention to provide a high speed press for manipulating the various portions of a multiple-action die with an accurately determined sequence and with sufficient power to mass produce extruded parts.

Another object of the present invention is to provide a press stroke controlled arrangement for shifting or manipulating several die elements to form a die cavity filled with extrusion material which retains the speed and accuracy of mechanical linkages while utilizing the power and flexibility of hydraulic actuation.

Another object of this invention is to provide, in a die element actuating press, a press stroke controlled arrangement for operating the die elements or portions which avoids intricate and unreliable mechanical linkages, and also eliminates the complex limit switches, valves, pumps and piping ordinarily associated with hydraulic actuation.

A further object of this invention is to provide, in a high speed reciprocating press, an arrangement for first bringing a pair of die elements into mating engagement around a slug or blank of extrusion stock and then causing the stock to move hydrostatically under pressure of a heading tool until the die cavity is completely filled.

A further object is to provide an arrangement whereby the generally harmonic reciprocatory ram motion of a crank press may be amplified at the conclusion of the deceleratory closing stroke to move a ram supported member with a greater velocity for various press operations.

A further object is to provide a mechanico-hydraulic power and control unit synchronized with the press stroke for operating accessory equipment associated with the press machine.

Further objects and advantages of the present invention will be apparent from the following detailed description, with reference to the accompanying drawings in which like reference characters refer to the same part throughout the several views, and in which:

FIGURE 1 is a front elevational view, partly in section, of a press of the standard mechanical crank variety embodying the hydraulic assist of this invention;

FIGURE 2 is a longitudinal sectional view of the ram mounted arrangement part way through the working stroke of the press;

FIGURE 3 is a sectional view corresponding to FIGURE 2 showing the ram in the closed position;

Figure 5:
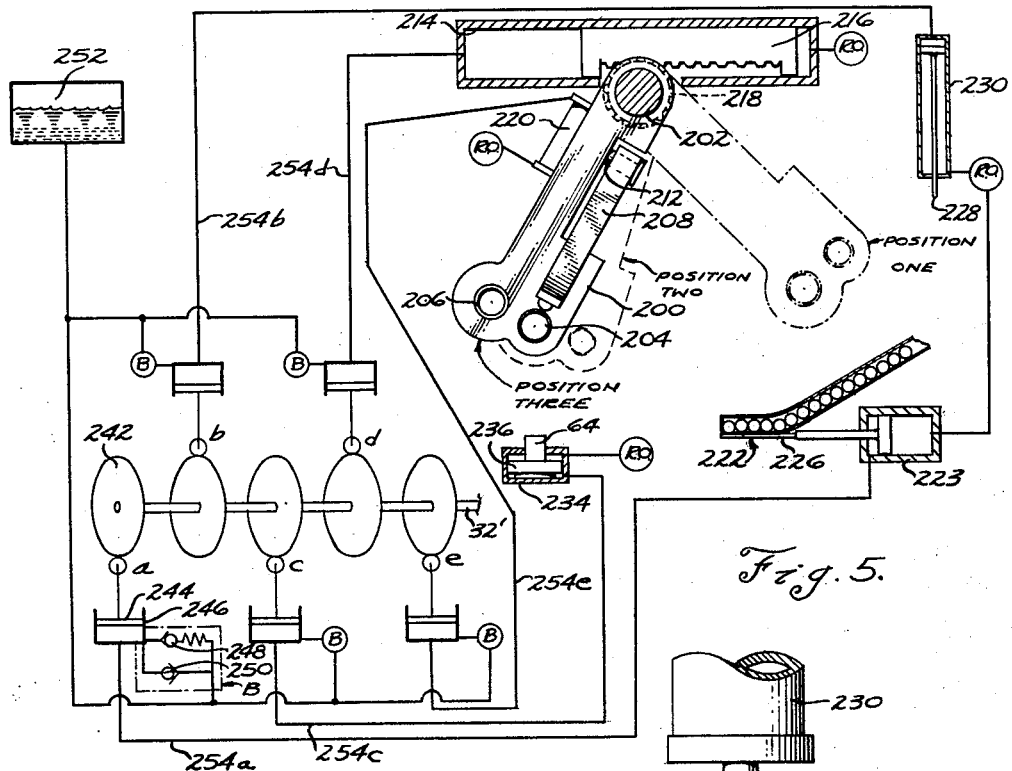
FIGURE 5 is a diagrammatic view of the mechanico-hydraulic motivator driven by the press crank shaft.

FIGURE 1 shows, by way of example only, a standard crank press upon which the features of this invention may be incorporated. Such a press may comprise a fixed bed 10 having relatively movable platens 12 and 14. The lower platen 14 may take the form of a massive bed 16 mounted securely in fixed relation to the frame 10. The upper platen 12 may be mounted for reciprocatory travel to and from the fixed bed 16 in suitable guides 18 bolted or otherwise secured to the side members 20 of the frame.

The ram or platen 12 may be shifted by any suitable means such as the mechanical crank variety of motion transfer and conversion linkage shown, wherein the platen 12 is provided with a cross shaft 22 trunnioned in the lower bearing 24 of a connecting rod 26. At its upper end, the connecting rod 26 is provided with an upper bearing 28 which surrounds the eccentric crank portion 30 of the main crank drive shaft 32. The latter is journalled in suitable bearings 34 mounted on the side members 20 below the crown 36 of the press. The crank shaft 32 may have a large bull gear 38 keyed at one end thereon, which may be rotated by a smaller pinion 40 keyed on the end of a primary drive shaft 42 upon the other end of which is mounted the fly-wheel 44. The fly-wheel shaft 42 may be rotated by a pulley 46 deriving rotary power from any suitable source which may comprise a prime mover such as the schematically illustrated electric motor 48. The other end of the crank shaft 32 may be utilized to drive a mechanico-hydraulic motivator 240 described in more detail below. A plurality of tie or strain rods 50 equipped with suitable heavy duty nuts 52 threaded on opposite ends thereof are utilized between the bed and crown in the conventional manner to provide the strength required for press operation.

Supported on the lower platen or bed is a bolster plate 54 rigidly supporting a die shoe 56 having a recess 58 in its upper surface to snugly receive the lower or fixed one 60 of the multiple die elements utilized in the pressing operation of this invention. The stationary gripper die 60 may have a cavity 62 machined therein to conform to the shape of the product or part which is to be headed or extruded. A knockout or ejector bar 64 may be associated with this die by means of suitable bores 66 in the die, the die shoe, the bolster plate and the bed. A fluid motor, described below, may be utilized to actuate the ejector pin 64 upon completion of each pressing operation. The upper face of the knockout rod 64 is also, in effect, a die element because it forms one of the enclosing surfaces of the die cavity.

Another gripper die 70 of the plurality of die elements is supported on the bottom ram face 72 of the traveling platen 12. This moving gripper die is arranged to be brought into mating engagement with the gripper die 60 to form an enclosed cavity as seen in FIGURE 3, the lower face of the die element 70 having a mating cavity 74 therein to aid in forming the finished part, as can be understood. The die 70 may be supported on a member 76 having a recess 78 to snugly engage the die element.

The final die element 80 having a convex rounded end with a cross-sectional area not much smaller than the area of the cavity 74 is supported by a punch holder 82 for manipulative movement into and out of the die cavity formed by the matching die elements 60 and 70 through a bore 84 in the die element 70 closely surrounding the punch or heading tool 80. The three main die elements 60, 70 and 80 are arranged so that when the two mating elements 60 and 70 are moved into mating engagement by travel of the press ram, they form a cavity surrounding a slug or blank 86 of extrusion material. Then, while the two die elements remain in their mating stationary positions, the third die element or heading tool 80 is moved into the cavity and against the material 86 at a speed and with a pressure sufficient to impart plastic like or hydrostatic flow to the metal slug 86 until its material is moved to completely fill the cavity surrounding the heading tool 80 to form a finished product.

The product shown in the drawings, purely by way of example, is a push rod seat for a hydraulic valve lifter for automotive type internal combustion engines. Such a push rod seat may be utilized in the hydraulic lifter or tappet in the manner shown at 312 in FIGURE 15 of Earl A. Thompson Patent 2,935,059 of May 3, 1960. The finished product, as can be seen, is a cup-shaped metal unit having a stepped cylindrical outer surface and a generally hemispherical inner or dished seat portion upon which the end of the push rod abuts during operation in an automotive engine. Every dimension on the piece is critical for assembly and operational purposes with the exception of the thickness of the bottom of the cup (between the ejector pin 64 and the heading tool 80), which may vary within certain prescribed tolerances. Consequently, it can be seen that a slightly oversized slug 86 of material will completely fill the cavity with a shorter travel of the tool 80 into the cavity; whereas, a smaller than average slug will require a longer travel of the heading tool to completely fill the cavity to the desired dimension.

The two movable die elements 70 and 80 are shiftably supported for relative movement on the lower face of the ram. A cylinder member or outer housing 90 is secured by bolts 92 extending through a flanged base 94 into the bottom face 72 of the movable platen 12. An inner cylinder chamber 96 having a cannelure or groove 98 for an O ring seal and another cannelure 102 for a purpose later to be described is partially closed at its lower end by an inturned flange or abutment 104.

In the base flange 94 may be a pair of relief and replenishing valves communicating between the upper portion 106 of the cylinder chamber and a reservoir 110. The reservoir may be located on the ram as suggested in FIGURE 1, and constitutes a source of liquid pressurized at low, super-atmospheric pressure by a head of air or other conventional pressure maintaining arrangement, not shown. The replenish or refill valve 112 comprises a ball 114 loaded against a relatively large circular valve seat 116 by a light retaining spring 118. The seat 116 is adjustable and communicates with the reservoir 110 by suitable piping 120. The relief valve 122 may comprise a ball 124 loaded against a circular valve seat 126 of relatively small area by means of a spring 128 the pressure of which may be adjusted by a threaded spring seat 130. Communication between the seat 126 and the reservoir 110 may be provided by suitable piping 132. As can be seen, when the pressure in the cavity or chamber 106 exceeds a certain value, the ball 124 will be moved away from the seat 126 by the pressure and allow liquid to escape to the reservoir 110; conversely, when the pressure in the chamber 106 tends to fall below that of the liquid in the reservoir 110, the ball 114 will come away from its seat 116 and allow pressure replenishment to the chamber 106.

Shiftable to and fro in the general direction of ram travel within the cylinder 96 is an annular or outer piston 140 having an upper face 142 which acts as a movable wall for the chamber 106, and having piston rings 144 to improve the sealing fit between the piston 140 and the cylinder 96. A concentric longitudinal bore or cylinder chamber 146 in the center of the annular piston 140 also contains an external cannelure 148 for an O ring seal 150 and another cannelure 152 for a purpose also later to be described. An internal shouldered portion 154 of the annular piston member 140 may serve as a spring seat located immediately above the movable mating gripper die element support 76. An external shoulder 156 may abut the inturned flange 104 of the cylinder member 90 to limit movement of the annular piston 140 away from the ram. It will be seen that this provides a lost motion connection between the mating gripper die element 70 and the botom face 72 of the ram.

Shiftable also in the direction of ram travel within the cylinder 146 of the annular piston 140 is a central or inner piston 160 having an upper face 162 which forms a second movable wall for the chamber 106. Thus, as long as the pressure conditions in the chamber 106 are between the high and low limits determined by the relief and refill valves respectively, the chamber 106 may be considered a constant volume chamber having a pair of shiftable walls 142, 162; obviously, if one of the walls is moved in a chamber diminishing direction the other will be moved in a chamber increasing direction by displacement of liquid from the inwardly moving wall to the other wall to move it outwardly. The central piston 160 is also provided with conventional piston rings 164, and its bottom face 166 is adapted to serve as a spring seat. Rigidly supported by means of an intermediate spacing member 168 on the lower face of the piston 160 is the previously described plunger support 82 for the heading tool 80.

A plurality of springs 170 located between the flange 154 of the outer piston and the bottom 166 of the inner piston serve to urge the heading tool 80 out of the cavity formed by the mating die elements 70 and 60. That is, the springs 170 bias the inner piston in a direction which tends to diminish the size of the constant volume chamber 106, which motion is limited by a central boss 172 on the upper face of the inner piston, and to bias the outer piston 140 in a chamber increasing direction which movement is limited by the shoulder 156 abutting the inturned flange 104 of the cylinder member 90. During the major portion of the press ram stroke when the die elements are not being manipulated, the pair of oppositely shiftable pistons will be in their spring-biased rest position illustrated in FIGURE 2.

To prevent excess leakage of liquid from the chamber 106 when it is subjected to high pressures near that of the relief valve setting, a leakage salvage and return system is provided. A bore 174 through the wall of the annular piston 140 communicates between the previously mentioned cannelure 152 on the inner cylindrical wall 146 and the previously mentioned cannelure 102 on the outer cylindrical wall 96. A bore 176 through the wall of the cylinder member 90 communicates between the cannelure 102 on the wall of the cylinder 96 and the exterior of the housing 90. Suitable piping 178 may be utilized to interconnect the bore 176 and the reservoir 110. When extremely high pressures exist in the chamber 106, any leakage in the cylinder 96 past the piston rings 144 and in the cylinder 146 past the piston rings 164 will be collected in the annular chambers 152, 102, which are in communication with the relatively low pressure reservoir 110. The O ring seals 100, 150 are adequate to prevent leakage between the relatively movable walls at reservoir pressure. Thus, high pressure leakage past the piston rings will be pressurized immediately back to the reservoir, and the O ring seals will prevent reservoir pressure leakage toward the lower end of both of the pistons.

Figure 4:
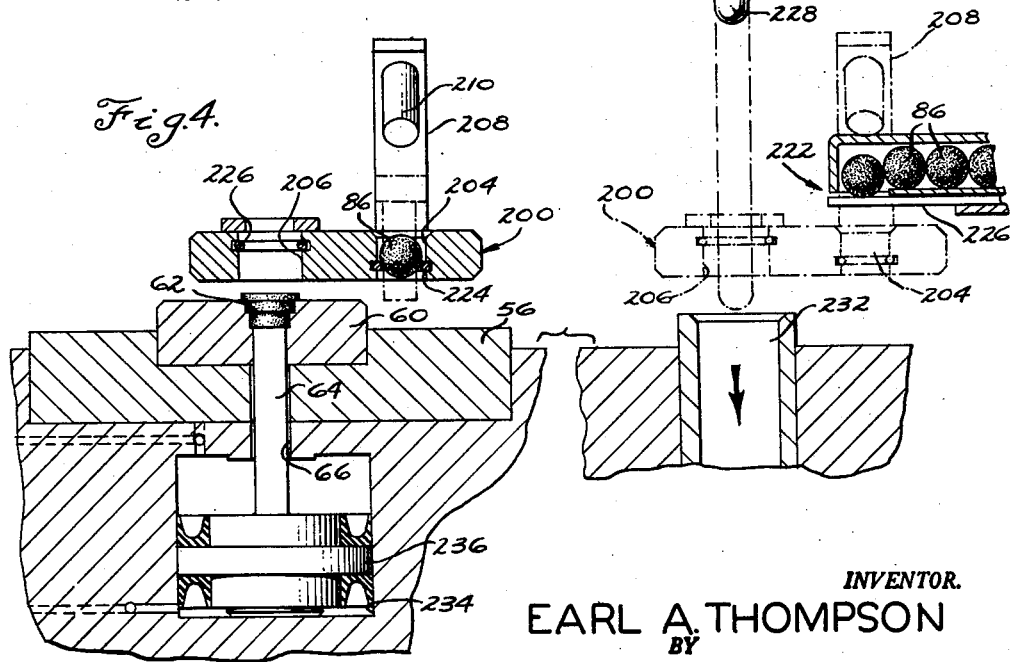
FIGURE 4 is a semi-schematic sectional view through the swinging end of an automatic loading device operated in timed relationship with the press stroke by the mechanico-hydraulic motivator of this invention.

Automatic loading and unloading apparatus is provided by this invention for removing a finished part from the lower die cavity 62 and replacing it with a new slug 86 of extrusion material during each upward stroke of the press. Such a device may comprise a horizontally swinging loading arm 200 pivotally mounted at 202 about a vertical axis on the bed 16 of the press, as best seen in FIGURES 4 and 5. The outer swinging end of the arm has a pair of work piece receiving sockets 204, 206 spaced equal radial distances from the vertical pivot axis of the arm. An ejector lever 208 having a downwardly depending finger 210 adapted to eject a work piece from the socket 204 is pivoted about a horizontal axis 212 on the arm for swinging motion in a vertical plane. A fluid motor on the press bed comprising a cylinder 214 and a double acting piston 216 including rack teeth which mesh with a piston 218 connected with the loading arm is utilized to swing the arm from a combined loading and unloading station to a second position wherein the work piece socket 206 is positioned momentarily above the die cavity 62 on the press and also to a third position wherein the socket 204 is positioned above the cavity 62 of the press. A similar double acting shiftable piston type fluid motor 220 mounted directly on the swinging arm 200 is connected to impart oscillatory motion to the ejector lever 208. Further details of the construction of such a combined three position loading and unloading apparatus carrying its own ejecting lever may be obtained from Earl A. Thompson Patent 2,978,117 of April 4, 1961.

The socket 204 contains, at its lower extremeties, a peripheral spring ring 224 to releaseably retain a ball in the socket. A similar peripheral spring ring 226 in the upper portion of the socket 206 is adapted to releasably retain a finished push rod seat in the socket 206.

When the arm 200 is stopped in its first position at the combined loading and unloading station (right-hand portion of FIGURE 4), the socket 204 is positioned beneath a gravity fed dispensing apparatus 222 containing unworked slugs 86 of extrusion material from a suitable supply source, not shown. A double acting shiftable piston type fluid motor 223 is connected with a sliding door 226 in a manner which permits a single slug 86 of extrusion material to fall under the influence of gravity into the socket 204 upon momentary retraction of the plate 226. Also, at the combined loading and unloading station, is an unloading pusher bar 228 which acts, under the influence of a suitable fluid motor 230, to eject a finished part from the socket 206 into a discharge chute 232.

At the second position of the arm, with the empty socket 206 positioned above the cavity 62 which contains a newly finished part (left-hand portion of FIGURE 4), and with the socket 204 containing a fresh slug 86 of extrusion material, the ejector plunger 64 is shifted upwardly by pressurized hydraulic fluid in the lower portion of a cylinder chamber 234 acting upon a piston 236. The plunger 64 lifts the part from the lower die cavity 62 and snaps its uppermost flanged portion beyond the releasable spring ring 226 to retain the finished part in the socket 206.

At the third position of the loading arm 200, with the socket 204 containing a fresh slug of extrusion material positioned above the cavity 62, the ejector lever 208 acting under the influence of the fluid motor 220 sweeps downwardly to eject the slug of extrusion material from the socket 204 and into the lower cavity 62. As the arm thereafter swings back to its first position at the combined loading and unloading station, it will be seen that a finished work piece has been removed from the die cavity, and a new slug of material provided therein.

For the purpose of giving coordinated motivation to the various fluid motors described above which operate the automatic loading and unloading apparatus, there is provided a mechanico-hydraulic programming system for producing a cycle of coordinated movement in synchronization with the stroke of the press. Such a system may be housed in a suitable casing 240, see FIGURE 1, mounted upon the side 20 of the press and adapted to be driven from the crankshaft 32 of the press. This system may be constructed as a self-contained unit and connected to the various hydraulic cylinders by suitable flexible or rigid piping. The unit comprises, as diagrammatically illustrated in FIGURE 5, a plurality of rotary cams each actuating a single-acting pulsator piston which transmits motion through liquid columns to the double-acting pulse responsive receiver piston in the fluid motors on the machine which are connected to shift the machine elements or load devices to and fro.

The main cam shaft 32' of the mechanico-hydraulic motivator unit may consist in effect an extension of the press crankshaft 32, and it may carry a plurality of cams 242, the roller type followers of which operate the transmitter pistons 244 reciprocable in fixed cylinders 246 to constitute expansible chamber type transmitters. Each section may comprise a unit duplicating the single-acting pulsating cylinder 246, the heads of which contain balancing valves comprising a spring-loaded pressure relief valve 248 and a replenishing check valve 250. All the replenishing and relief valves are connected to a common oil reservoir 252, similar to the reservoir 110, which may be formed in the housing of the unit. The reservoir 252 is preferably subjected to a low, super-atmospheric pressure by a body of compressed air or other pressure maintaining arrangement. Check valve 250 allows flow from the reservoir 252 to the cylinder 246, while relief valve 248 allows flow oppositely when the cylinder pressure exceeds a certain value. Thus, each of the pairs of valves 248, 250 may be referred to as a balancing valve which serves to balance the volume of fluid in each of the liquid column sections, as will be later described.

In FIGURE 5, five such liquid column pulsator sections are shown, and are designated by the letters $a$ through $e$. The pulsator section $a$ is connected by a closed liquid column line 254$a$ with the shiftable piston fluid motor 223 for operating the sliding door 226 of the slug dispensing apparatus 222 at the combined loading and discharge station. Pulsator section $b$ is connected by a closed liquid column 254$b$ with the fluid motor 230 which operates the plunger 228 to eject a finished work piece from the arm socket 206 to the discharge chute 232 also at the first position of the arm. Pulsator section $c$ connects by its liquid column 254c with the cylinder 234 below the piston 236 to actuate the ejector plunger 64 to shift a finished work piece from the cavity 62 to the arm socket 206 when the arm is in position two. Pulsator section d connects by means of its liquid column 254d with fluid motor which oscillates the swinging loading arm 200 between its three positions. And, pulsator section e connects by a closed liquid column 254e with the fluid motor 220 on the arm 200 which swings the ejector lever 208 to shift a slug of material from the socket 204 to the cavity 62 in the loading arm's third stopped position.

In order to insure proper synchronization of the driving and driven elements of each pulsator section, it is desirable to provide slightly more fluid displacement in the driving or transmitting elements 244, 246 than is present in their respective double acting fluid motors at the opposite end of the liquid column line. Thus, at the end of each advancing stroke of the transmitter piston 244, a small amount of fluid will be discharged to the reservoir 252 through the relief valve 248. This amount, plus any amount lost by leakage will be returned to the liquid column at the end of the return stroke by the operation of the replenishing valve 250.

In FIGURE 5, there are shown several circles marked RO connected to the end of the motive cylinders opposite the liquid column connections. These symbols designate the return oil connections by means of which a pulsator system may be hydraulically biased so as to maintain the follower in close contact with the cam as the falling portion of the cam contour recedes from the follower. This bias is maintained by a high pressure accumulator or oil reservoir, not shown, which may be provided with a manifold whereby all of the RO connections are joined together and to the high pressure reservoir. The showing of separate return oil connections in FIGURE 5 is indicative of any suitable type of biasing pressure source, whether it be a single accumulator or multiplicity thereof. The contours of the individual cams 238 are likewise not illustrated in specific detail, since they may be formed in accordance with the usual practice to cause motivation of each of the respective hydraulic motors in accordance with the particular operating cycle desired for the press.

In operation, with a slug 86 of extrusion material located in the cavity 62 of the lower or stationary gripper die 60 the extrusion operation may proceed. The crank of the press will drive the ram toward the bed 16 with a generally harmonic motion, decelerating rapidly at the closing extent of the stroke. During this downward portion of the working stroke the two pistons assume the position indicated in FIGURE 2, as previously mentioned. Near the end of the closing stroke, the movable gripper die 70 is brought into mating engagement with the stationary gripper die 60 so that the opposed cavities 74, 72 form a die cavity or mold surrounding the slug 86 of extrusion material. As the ram and its associated cylinder housing member 90 continue downward movement, the upper face 142 of the annular piston 140 is held stationary by the abutment of the gripper dies 60 and 70, and the lost motion connection of the annular piston supported die 70 is taken up. With the upper face 142 of the annular piston thus moved in a chamber-diminishing direction by continued downward movement of the rest of the chamber, hydraulic medium will be displaced from between the annular piston and the ram to between the central piston and the ram to cause additional movement of the piston 160 away from the ram, as can be seen in reference to FIGURE 3. As the springs between the two pistons 170 are compressed, the central piston 160 moves downward at a greater velocity than the ram; for instance, if the upper faces 142, 162 of the pair of pistons are of equal area, approximately as shown in the drawings, the central piston will move with twice the velocity of the ram because the annular piston is stationary. Additional rapid downward movement of the central piston 160 moves the heading tool into the die cavity and against the blank 86 until the extrusion material has undergone plastic-like flow to completely fill the die cavity and surround the heading tool and take the desired form of a part precisely finished in every dimension. When the die cavity is completely filled by the extrusion material, the ram will have a little more travel remaining, as indicated by the dash-dot lines on FIGURE 3, to compensate for variations in the quantity of extrusion material in the slug 86. However, overtravel of the ram causes no breakage of press equipment because the relief valve 122 will divert liquid to the reservoir 110, after the common fashion.

The relationship between the upper face areas 142 and 162 of the two pistons prevent the die element 70 from being lifted away from the stationary element 60 by the hydrostatic action of the extrusion material flowing under pressure of the heading die 80. If the upper faces of the pistons are of equal area, approximately as shown in the drawings, considerably more force is exerted downwardly on the die 70 than can be exerted upwardly by pressure transmitting action of the extrusion slug. The only pressure that will act upwardly to lift the die 70 will be that over and above the pressure absorbed by the relatively viscous metal itself in overcoming its inherent initial resistance to liquid-like flow. With a material such as steel which has a high natural resistance to flow at normal temperatures, it can be seen that the large amount of pressure absorbed in starting it to flow allows considerable latitude in designing dies wherein the ratio of the effective area of the die 70 to the effective area of the heading die 80 can be greater than the area ratio of annular plunger 140 to the inner plunger 160.

As the ram begins its upward travel on the non-working stroke, the heading tool 80 will first be retracted from the finished part of the action of the springs 170 tending to bias the pistons back to their rest positions. At this point, the gripper die 70 acts as a spring loaded stripper plate to remove the finished part from the heading tool 80. Continued upward travel of the ram will allow the pistons to resume their spring-urged rest positions at which point the mating die elements will be separated by the lifting action of the flange 104 on the ram and the refill valve 112 will again balance the volume of liquid in the cavity 106.

As the press ram continues its upward travel, the loading arm 200 under control of section d of the mechanico-hydraulic motivator swings to its second position wherein the work piece socket 206 stops momentarily above the cavity 62. The ejector finger 64 associated with the cavity 62 thereupon shifts, under control of motivator section c, the finished work piece from the cavity 62 into the socket 206, and then the arm indexes to the third position.

At the third position, the socket 204 is positioned above the cavity 62 and the ejector plunger 64 has been retracted to its normal rest position. Ejector lever 208 under control of the fluid motor 220 swings the finger 210 downwardly through the socket 204 and positions a new slug of material 86 in the cavity 62. By this time the press has completed its upward stroke and is beginning to descend for the next successive pressing operation.

The camshaft 32' of the mechanico-hydraulic motor rotating synchronously with the crankshaft 32 of the press continues to operate the automatic loading and unloading mechanism in timed relationship with the press stroke to swing the loading arm 200 out of the way of the descending press and back to its first position at the combined loading and unloading station.

While the press is performing the next successive pressing operation on the newly supplied slug 86 of material in the cavity 62, the loading arm 200 at its first position receives a new slug of material in its cavity 204 by operation of the fluid motor 223 under control of the motivator section a; likewise, the finished workpiece is ejected from the socket 206 by the plunger 228 under control of the motivator section b. By the time the arm is loaded and has begun to swing back towards its second stop position, the press has completed its working stroke and is once again partaking of upward travel.

Thus, an extrusion die element actuating or manipulating press arrangement is provided which brings a plurality of mating die elements into matching arrangement to form a die cavity for completely surrounding a slug of extrusion material. As soon as the die elements are arranged, a heading tool is introduced into the cavity with a velocity considerably greater than that of a crank actuated platen or ram. If the upper faces of the pistons are of equal area, for instance, the die element 70 will be held in mating engagement with the element 60 with pressure equal to that with which the plunger 80 enters the cavity. This prevents separation of the mating die elements during the high pressure extrusion process, an operation which is exceedingly difficult to perform successfully with the type of spring-loaded pressure pads occasionally found on punch press operations. The load on the pressure relief spring 128 determines the amount of pressure which will be exerted on the stock in the die cavity. This pressure may be adjusted for any given situation so that the relief valve 122 will "pop-off" the instant the die cavity is filled.

The compact arrangement of the oppositely movable walls of the constant volume chamber 106, formed by the faces of the pair of concentric pistons, represents an economic saving over prior devices. Original costs of parts, original assembly of the parts, and the infrequent disassembling, maintenance and repair costs of the very few moving parts renders the hydraulic assist of this invention readily adaptable to a multitude of press problems whether for mechanical or hydraulically operated presses. Obviously, one of ordinary skill in the press art could incorporate the arrangement proposed by this invention to advantage in many high volume mass production machine tools, either with or without the mechanico-hydraulic powered and controlled loading and unloading apparatus.

While the above described embodiment constitutes a preferred mode of carrying out this invention, many other forms might be adopted within the scope of the actual invention, which is variously claimed as:

In an automatic press having a main press frame, the combination comprising platens mounted for relative movement on the frame, a main drive shaft mounted for rotation in fixed relation to the frame, a single primary power source connected to rotate the shaft, a motion transfer and conversion linkage operated by the shaft to cause relative opening and closing movement of the platens, a multiple-action die having elements mounted on both platens, some of the elements being movably mounted relative to their respective platen, a closed liquid filled chamber forming a first motion transmitting device between the movably mounted elements for causing reciprocal motion therebetween coordinated with the opening and closing movements of the platens, means on the frame for unloading finished work pieces from the die and loading unfinished work pieces into the die prior to each closing of the platens, a plurality of returned biased shiftable piston type fluid motors connected to operate the loading and unloading means, a plurality of rotary cam operated single acting hydraulic pulsator units, a plurality of liquid columns forming second motion transmitting devices interconnecting the pulsator units and the fluid motors for transferring cam motion therebetween, and a common camshaft means operated by and driven synchronously with the press drive shaft and connected to operate the pulsator units through a predetermined sequence of movements whereby the loading and unloading of work pieces to and from the multiple-action die and the relative motion between the die elements are coordinated with the opening and closing movements of the platens.

References Cited in the file of this patent
UNITED STATES PATENTS

| | | |
|---|---|---|
| 1,971,937 | Keck | Aug. 28, 1934 |
| 2,909,955 | Williams | Oct. 27, 1959 |
| 2,978,117 | Thompson | Apr. 4, 1961 |
| 3,064,507 | Strugala | Nov. 20, 1962 |